United States Patent
Frank et al.

(10) Patent No.: US 8,051,248 B2
(45) Date of Patent: Nov. 1, 2011

(54) TRANSIENT TRANSACTIONAL CACHE

(75) Inventors: Michael Frank, Sunnyvale, CA (US);
David J. Leibs, San Mateo, CA (US);
Michael J. Haertel, Portland, OR (US)

(73) Assignee: GLOBALFOUNDRIES Inc., Grand Cayman (KY)

(*) Notice: Subject to any disclaimer, the term of this patent is extended or adjusted under 35 U.S.C. 154(b) by 638 days.

(21) Appl. No.: 12/115,355

(22) Filed: May 5, 2008

(65) Prior Publication Data

US 2009/0276573 A1   Nov. 5, 2009

(51) Int. Cl.
*G06F 12/08* (2006.01)
(52) U.S. Cl. .......................... 711/120; 711/130
(58) Field of Classification Search .......................... None
See application file for complete search history.

(56) References Cited

U.S. PATENT DOCUMENTS

| | | | |
|---|---|---|---|
| 5,428,761 A * | 6/1995 | Herlihy et al. | 711/130 |
| 6,542,966 B1 * | 4/2003 | Crawford et al. | 711/133 |
| 6,598,124 B1 * | 7/2003 | Damron et al. | 711/133 |
| 2005/0108478 A1 * | 5/2005 | Holloway et al. | 711/119 |
| 2008/0126883 A1 * | 5/2008 | Caprioli et al. | 714/49 |
| 2008/0301378 A1 * | 12/2008 | Carrie | 711/147 |

OTHER PUBLICATIONS

Bahar et al. (Power and Performance Tradeoffs using Various Caching Strategies), published by ACM, Aug. 10-12, 1998, pp. 64-69.*
Hammond et al. (Transactional Coherence and Consistency: Simplifying Parallel Hardware and Software), published 2004 by IEEE computer society, 0272-1732/04, pp. 92-103.*
Stephen M. Blackburn, et al., "Transient Caches and Object Streams," Australian National University Technical Report, TR-CS-06-03, Oct. 2006, 10 pages.
Maurice Herlihy, et al., "Transactional Memory: Architectural Support for Lock-Free Data Structures," Proceedings of the 20th Annual International Symposium of Computer Architecutre, May 16-19, 1993.
Stephen M. Blackburn, et al. "The Transient Cache: Modern Programs and Modern Cache Design," 7th Annual Austin CAS International Conference, Feb. 16-17, 2005.

* cited by examiner

*Primary Examiner* — Kaushikkumar Patel
(74) *Attorney, Agent, or Firm* — Lawrence J. Merkel; Meyertons, Hood, Kivlin, Kowert & Goetzel, P.C.

(57) ABSTRACT

In one embodiment, a processor comprises an execution core, a level 1 (L1) data cache coupled to the execution core and configured to store data, and a transient/transactional cache (TTC) coupled to the execution core. The execution core is configured to generate memory read and write operations responsive to instruction execution, and to generate transactional read and write operations responsive to executing transactional instructions. The L1 data cache is configured to cache memory data accessed responsive to memory read and write operations to identify potentially transient data and to prevent the identified transient data from being stored in the L1 data cache. The TTC is also configured to cache transaction data accessed responsive to transactional read and write operations to track transactions. Each entry in the TTC is usable for transaction data and for transient data.

17 Claims, 6 Drawing Sheets

TRANSIENT TRANSACTIONAL CACHE

SUMMARY

In one embodiment, a processor comprises an execution core, a level 1 (L1) data cache coupled to the execution core and configured to store data, and a transient/transactional cache (TTC) coupled to the execution core. The execution core is configured to generate memory read and write operations responsive to instruction execution, and to generate transactional read and write operations responsive to executing transactional instructions. The L1 data cache is configured to cache memory data accessed responsive to memory read and write operations to identify potentially transient data and to prevent the identified transient data from being stored in the L1 data cache. The TTC is also configured to cache transaction data accessed responsive to transactional read and write operations to track transactions. Each entry in the TTC is usable for transaction data and for transient data.

BRIEF DESCRIPTION OF THE DRAWINGS

The following detailed description makes reference to the accompanying drawings, which are now briefly described.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

In various embodiments, a processor may implement a transient/transactional cache (TTC). The TTC may be designed to cache potentially transient data and transactional data. That is, the TTC may comprise cache entries that can store transient data or transactional data, as needed.

For transient data, the TTC may generally allocate storage for data corresponding to memory read and write operations generated by the processor that miss the level 1 (L1) data cache. Thus, all memory operations that miss the cache may initially be monitored to identify potentially transient data. Transient data may be data that is referenced by the processor only one time or a few times, and then is not referenced again (at least within a reasonable time frame in which the data might be expected to remain in a cache such as the L1 data cache). Object-oriented execution (e.g. C++, Java, etc.) may frequently create objects, use the objects for a brief period of time, and destroy the objects. Accordingly, object data may be transient data (at least for short lived objects). By allocating cache misses to the TTC, and monitoring accesses to the data in the TTC, transient data may be identified and may be prevented from being cached in the L1 data cache (and thus may be prevented from displacing data from the L1 data cache that is more likely to be referenced again). Essentially, the TTC may serve as a filter for the transient data.

Write misses may be allocated to the TTC, but may not read the cache line that is updated by the write from memory. Instead, the writes may be accumulated in the TTC, and the TTC may track which bytes have been written within the line. At a later point, if the line in the TTC that stores the accumulated writes is evicted, the writes may be transmitted to the memory hierarchy. Alternatively, if the writes are detected as being non-transient, the line may be read from the memory hierarchy and the writes may be merged into the line. The merged line may then be cached in the L1 data cache.

The processor may support transactional instructions that can be used to read and write data that is part of a transaction. Transactions may be an alternative to locked memory accesses, which tend to be low performance operations since the overhead of ensuring the lock may increase the latency of the accesses (or the overall latency of all accesses, if the lock mechanism prevents all other accesses during the time that the lock is active). Writes that are part of a transaction may be performed, and then if the transaction completes successfully the write data may become available to other processors/devices. On the other hand, if the transaction fails (e.g. due to interference from another processor or device that reads the write set or writes either the read set or the write set), the writes may be discarded and the transaction may be reattempted.

Generally, transactional instructions may read and write data, and the data becomes part of the read set (the locations read by the transaction) or the write set (the locations written by the transaction). During the pendency of the transaction, the read set and the write set may be monitored to detect any interfering accesses by another processor or device in the system. The read set may permit other reads, but may be interfered with if a write occurs. Any access to the write set may be considered an interference, since the data written by the transaction is not available to be read by other processors/devices until the transaction is successfully completed.

The transactional instructions may be specific instruction encodings in the instruction set architecture implemented by the processor, or may be identified via operand data. The transactional instructions may cause the processor to generate transactional read and write operations. The transactional read and write operations may be reads and writes of memory locations, but may be identified as transactional (as compared to memory read and write operations, which are generated from non-transactional instruction execution and do not identify data that is part of a transaction). The transactional instructions may include, for example: a load transaction instruction which reads data and indicates that the data is part of a transaction; a get transaction data which also reads transaction data, but indicates that the data is likely to be written and thus the processor may attempt to get an exclusive (or owned) copy of the data; a verify instruction that can be used during the transaction to determine if the transaction has already been compromised (e.g. to permit early termination and restart of the transaction); and a commit instruction that may be used at the end of a transaction to commit all changes if the transaction was successful (or fail, if the transaction was compromised, and cause all changes to be discarded). The verify and commit instructions may be examples of a transactional instruction that is defined to determine if the transaction has been compromised. Such instructions may have other operations (e.g. the commit may cause the memory writes that are part of the transaction to become available to other processors/devices if the transaction succeeds). A transaction is compromised if at least one interfering access from another processor or device has been detected in the read set and/or the write set of the transaction. There also may be a store transaction data instruction. Alternatively, transactions may be required to read any data that they write, and normal stores may be performed to transaction data locations and such stores may automatically be tracked as transaction data since they hit on transactional lines in the TTC. Data read in response to the load transaction data and get transaction data instructions may be part of the read set of the transaction. Data written by the store transaction data instruction (or stores to data that is being tracked as part of a transaction) may be part of the write set of the transaction.

By caching transaction data in the TTC and monitoring the transaction data there, the transaction tracking data and associated logic may be localized to the TTC and need not be implemented in the L1 data cache. Additionally, performing the verify or commit may be relatively fast, since only the TTC entries need to be checked for transaction data. In some embodiments, the TTC may have a lower capacity than the L1 data cache (e.g. a few entries, such as 8 or 16 entries, as compared to hundreds of entries in the L1 data cache). Additionally, in some embodiments, the TTC configuration may be simpler to scan through. For example, an embodiment of the TTC may be fully associative and thus entries may be accessible in parallel, as compared to a direct mapped or set associative configuration for the L1 cache, in which multiple accesses would be required to access all cache entries.

Because the TTC is finite and is the location in which transaction data is tracked, it is possible that larger transactions may not fit in the TTC and some data may be evicted to track other data. The processor may detect the eviction of transaction data and take corrective action. In various embodiments, the corrective action may include one or more of: setting an overflow indication that causes the commit/verify to fail and that may be software accessible; causing an exception to software; etc. Software may perform the transaction using software transaction support if the transaction is larger than the TTC can track.

Additionally, by providing the TTC capable of storing both potentially transient data and transaction data, efficient use of the TTC cache storage may be performed. If no transactional memory operations are being performed, the TTC may cache more potentially transient data and may thus identify more actual transient data and may prevent more actual transient data from being stored in the L1 data cache. Furthermore, all TTC cache storage may be available to cache and monitor transaction data.

Figure 1:
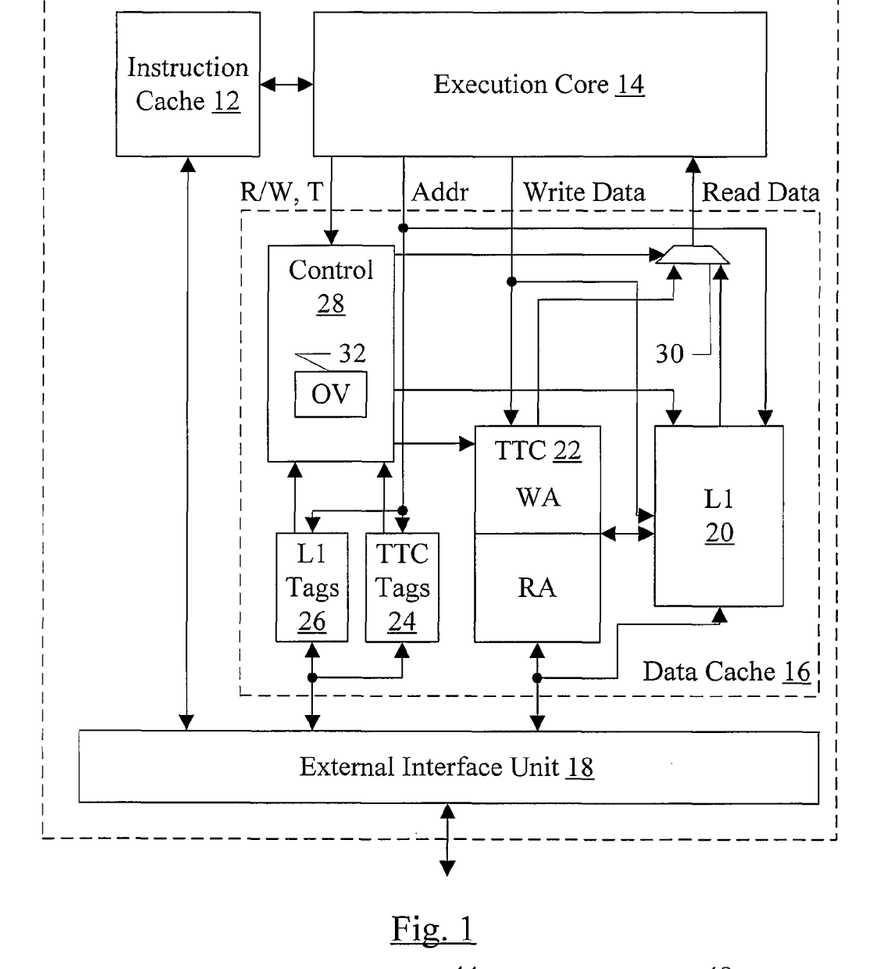
FIG. 1 is a block diagram of one embodiment of a processor.

Turning now to FIG. 1, a block diagram of one embodiment of a processor 10 is shown. In the illustrated embodiment, the processor 10 includes an instruction cache 12, an execution core 14, a data cache 16, and an external interface unit 18. The instruction cache 12 and the data cache 16 are coupled to the external interface unit 18 and to the execution core 14.

In the illustrated embodiment, the data cache 16 includes a level 1 (L1) data cache 20 and a transient/transactional cache (TTC) 22. Corresponding tag memories for each cache data storage are shown as well (TTC tags 24 and L1 tags 26). That is, the TTC tags 24 may comprise a tag for each entry in the TTC 22, and the L1 tags 26 may comprise a tag for each entry in the L1 data cache 20. Each entry in either cache comprises storage for a cache line (or cache block) of data, wherein the cache line/block is the unit of allocation/deallocation in the cache. The data cache 16 also includes a control unit 28 and a mux 30. The control unit 28 is coupled to the mux 30, the caches 22 and 24, and the tag memories 24 and 26. The cache 22 and 20 are coupled to the execution core 14, the mux 30, and the external interface unit 18. The execution core 14 is further coupled to the tag memories 24 and 26 and the mux 30. The control unit 28 may include an overflow indication (OV) 32, which may be used to track if transactions include more cache lines that can be tracked in the TTC 22.

The TTC 22 may comprise a combined transient data cache and transactional data cache. That is, each entry in the TTC 22 may store either potentially transient data or transaction data. The potentially transient data may comprise memory data that is fetched to the data cache 16 in response to data cache misses. That data may be cached in the TTC 22 to identify the transient data and prevent the transient data from being stored in the L1 data cache 20 (and may thus prevent data that may be accessed again from being displaced by transient data). The transaction data may be data that is part of a memory transaction, which may be identified by specific instructions that the processor 10 supports in order to support transactions. That is, the transaction data may be cached in the TTC 22 to track the transaction and ensure that it has not been compromised by accesses performed by another processor.

The TTC 22 may have any configuration and capacity. In one embodiment, the TTC 22 may be fully associative. Additionally, in one embodiment, the TTC 22 may be divided into write allocate (WA) and read allocate (RA) sections, at least with regard to transient data operation. The division may be static (e.g. part of the hardware design of the TTC 22) or dynamic (e.g. programmable by software). If a write miss occurs for a memory write operation in both the L1 data cache 20 and the TTC 22, the control unit 28 may allocate an entry in the WA section of the TTC 22 and may store the write data in the allocated entry. If a read miss occurs for a memory read operation in both the L1 data cache 20 and the TTC 22, the control unit 28 may allocate an entry in the RA section of the TTC 22. In one embodiment, for transactional read/write operations, the control unit 28 may allocate entries without regard to the sections. Other embodiments may allocate transactional read operations in the RA section and transactional write operations in the WA section.

The execution core 14 may be configured to fetch instructions from the instruction cache 12, and may execute the instructions. The execution core 14 may generate memory read and write operations (e.g. responsive to implicit or explicit loads and stores in the instructions), and may transmit the memory read and write operations to the data cache 16. Additionally, the execution core 14 may generate transactional read and write operations responsive to executing transactional instructions. Specifically, the execution core 14 may transmit an address (Addr in FIG. 1), which may be received by the caches 20 and 22 and the tag memories 24 and 26, and corresponding read/write (R/W) and transaction (T) indications, which may be received by the control unit 28. The execution core 14 may transmit write data (Write Data in FIG. 1) to the TTC 22 and the L1 data cache 20, and may receive read data (Read Data in FIG. 1) from the mux 30. The transaction indication may indicate whether the operation is a transactional operation or a memory operation.

The L1 tags 26 may index based on the address, and select one or more tags according to the index for comparison to a corresponding tag portion of the address. The TTC tags 24 may perform a fully associative compare of the tags to the tag portion of the address. The tag portion of the address may differ for the L1 tags 26 and the TTC tags 24. For example, the L1 tags 26 may exclude the cache offset bits and the index bits from the tag comparison. The TTC tags 24 may use the entire address except for the cache offset portion (or may even include the cache offset portion, to match to incomplete cache lines in the WA section). The tag memories 24 and 26 may communicate hit/miss information to the control unit 28. The L1 data cache 20 may receive the address as well (or at least the index portion) to index the entries that may be hit by the address.

Based on the hit/miss information, the control unit 28 may provide control signals to the TTC 22 and the L1 data cache 20. For example, the control unit 28 may provide write enables for write operations and read enables for read operations, depending on which entry in the L1 data cache 20 or the TTC 22 (if any) is hit by the operation. For memory read operations, the control unit 28 may control the mux 30 to select data output by the TTC 22 or the L1 data cache 20, dependent on which is hit by the read operation. Still further, data may be transferred between the L1 data cache 20 and the TTC 22, such as non-transient data being moved from the TTC 22 to the L1 data cache 20 and transaction data moving from the L1 data cache 20 to the TTC 22. Additional details for each operation are provided below, with regard to the flowcharts illustrated in FIGS. 3-7.

The external interface unit 18 may communicate with the data cache 16 as well. For cache misses, the external interface unit 18 may receive fill requests to fetch the corresponding cache lines. The external unit 18 may also receive modified lines (or partial lines, from the TTC 22) that have been evicted (or cast out) from the data cache 16. The external interface unit 18 may receive snoops from the external interface, and may transmit those to the data cache 16 to detect snoop hits. The external interface unit 18 may also communicate with the instruction cache 12 to perform cache fills for instruction cache hits and misses.

Generally, the external interface unit 18 may be configured to communicate with an external interface to other components in a system with the processor 10. For example, the external interface unit 18 may communicate with another cache level (e.g. a level 2, or L2, cache). The processor 10 may be integrated onto a single integrated circuit with the L2 cache, or may be separate. In another embodiment, the processor 10 may be a processor core in a multicore integrated circuit, and may be integrated with an L2 cache as well in some such embodiments. In still other embodiments, the external interface unit 18 may communicate with non-cache components (e.g. a memory controller and/or a bus bridge). Thus, the external interface may be a proprietary internal interface, a bus interface, a packet based interface, etc., in various embodiments.

The execution core 14 may have any internal construction. For example, various embodiments may be superscalar or scalar; pipelined or superpipelined, multithreaded or single threaded; in-order or out of order; speculative or non-speculative; etc.; or any combination of the preceding.

Figure 2:
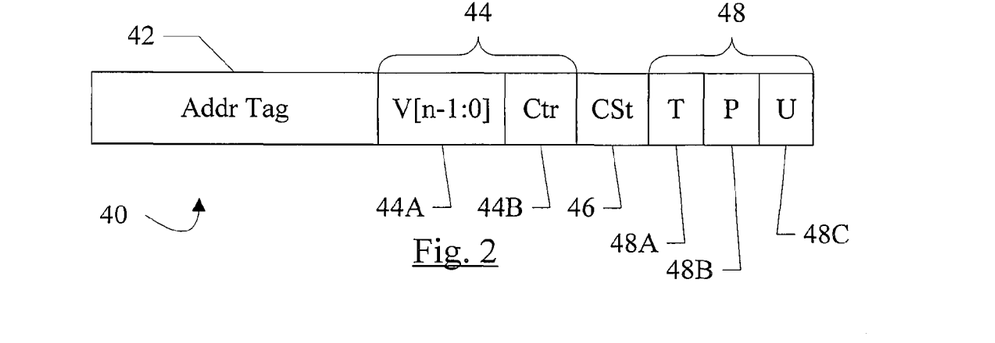
FIG. 2 is a block diagram of one embodiment of a tag that may be implemented in a transient/transactional cache shown in FIG. 1.

Turning next to FIG. 2, a block diagram of one embodiment of a TTC tag 40 is shown. The TTC tags 24 may comprise a TTC tag 40 for each entry in the TTC 22. In the illustrated embodiment, the TTC tag 40 may include an address tag field 42, transient tracking data 44, a cache state field 46, and transaction tracking data 48.

The address tag field 42 may store the address tag bits for the cache line. In one embodiment, the address tag bits may comprise all of the address bits except for the cache line offset bits. The address tag bits may be compared to corresponding bits of an input address from the execution core 14 or a snoop address from the external interface unit 18 to detect a hit. The cache state field 46 may store the cache state of the cache line according to the cache coherency protocol implemented by the processor 10. For example, various embodiments may implement the Modified, Owned, Exclusive, Shared, Invalid (MOESI) protocol, the MESI protocol, subsets thereof, etc.

The transient tracking data 44 may be used for non-transaction TTC lines, to track access to the cache line to identify transient or non-transient cache lines. The transient tracking data may include a valid bit vector 44A and a counter 44B. The valid bit vector 44A may be used for memory write operations, to identify which bytes in the cache line have been written. There may be a valid bit per byte, for example. The valid bit may be set to indicate that the byte has been written (and thus is valid in the TTC 22) and clear to indicate that the byte has not been written, or vice versa. The valid bit vector 44A may be used in addition to the address tag comparison to detect a hit for a read. If a read matches the address tag but not all bytes accessed by the read are valid, then the cache line may be read from memory and merged with the write data. In embodiments in which the WA section of the TTC 22 is static, only the tags corresponding to entries in the WA section may implement the valid bit vector 44A. The counter 44B may be used to count accesses to the cache line. The counter may be initialized when the cache line is allocated into the TTC 20, and may be modified for each access. If the number of accesses exceeds a threshold (fixed or programmable), the cache line may be deemed to be non-transient. The threshold may differ for WA section lines and RA section lines (e.g. multiple writes may occur to modify a cache line, e.g. when an object is created, while still being transient data).

The transaction tracking data 48 may be used for transaction data, to track the progress of the transaction. In the illustrated embodiment, the transient transaction data 48 may comprise a transaction indication (T) 48A, a probed indication (P) 48B, and an updated indication (U) 48C. Each indication may comprise a bit indicative, when set, of one state and indicative, when clear, of another state. Other embodiments may use other indications. The remainder of this disclosure may refer to the T indication 48A as the T bit; the P indication 48B as the P bit; and the U indication 48C as the U bit. However, other embodiments may use other indications or the opposite meanings of the set and clear states. The T bit 48A may indicate whether the cache line in the corresponding entry is transaction data (set) or potentially transient memory data (clear). The P bit 48B may indicate that the transaction has been compromised by a probe (set) or not compromised (clear). The U bit 48C may indicate the cache line has been updated in the transaction (set) or not updated (clear). That is, the U bit may indicate whether the cache line is part of the write set (U bit set) or the read set (U bit clear) of the transaction.

It is noted that, in some embodiments, the TTC 22 may support more than one transaction in progress at a time. In such embodiments, the transaction tracking data 48 may include a transaction identifier to identify which transaction the corresponding data belongs to. Other embodiments may include alternative, additional, and/or substitute transaction tracking data 48 and transient tracking data 44.

Figure 3:
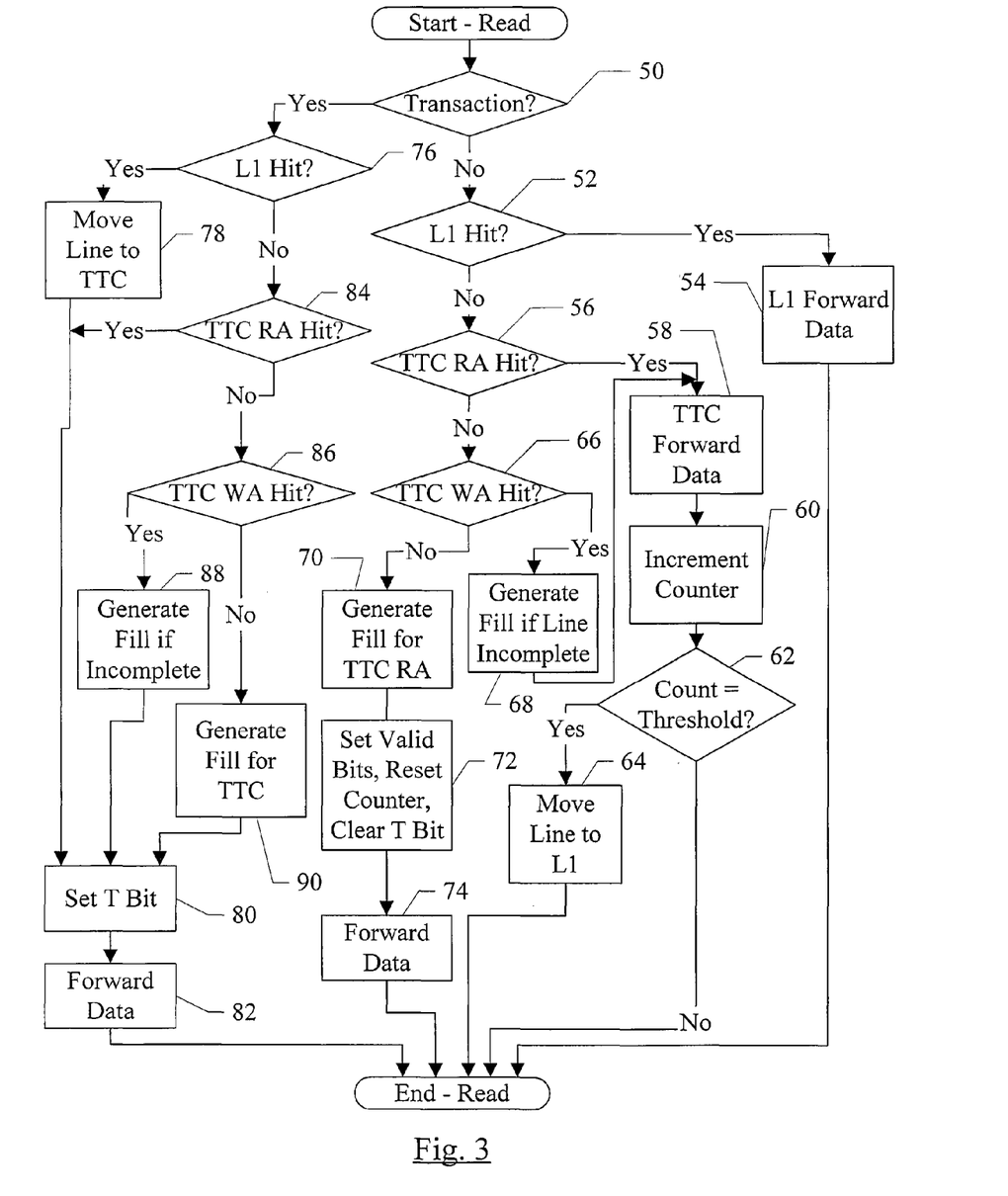
FIG. 3 is a flowchart illustrating operation of one embodiment of the processor for read operations.

Turning next to FIG. 3, a flowchart is shown illustrating operation of one embodiment of the processor 10 for a read operation. While the blocks are shown in a particular order for ease of understanding, other orders may be used. Blocks may be performed in parallel in combinatorial logic in the processor 10. Blocks, combinations of blocks, and/or the flowchart as a whole may be pipelined over multiple clock cycles in the processor 10. Particularly, checking for cache hits in the L1 data cache 20 and the TTC 22 may be performed in parallel.

If the read operation is not a transactional read (decision block 50, "no" leg), the operation is a memory read operation. If the memory read operation is a hit in the L1 data cache 20 (decision block 52, "yes" leg), the L1 data cache 20 may forward the read data (block 54). The control unit 28 may select the L1 data through the mux 30 to be returned to the execution core 14 as the read data, and may also assert a read enable for the hitting entry to the L1 data cache 20, in some embodiments. If the read operation is a hit in the TTC 22, in the RA section (decision block 56, "yes" leg), the TTC 22 may forward the read data (block 58). The control unit 28 may select the TTC data through the mux 30 to be returned to the execution core as the read data, and may also assert a read enable to the TTC 22, in some embodiments. Additionally, the control unit 28 may increment the counter in the counter field 44B for the hit entry (block 60). If the count exceeds a threshold for reads (decision block 62, "yes" leg), the control unit 28 may determine that the cache line is not transient data and may move the cache line to the L1 data cache 20 (block 64). Moving the line may include transmitting the line from the TTC 22 to the L1 data cache 20, allocating a storage location in the L1 data cache 20 (and evicting the cache line stored therein to the external interface unit 18, if applicable), writing the L1 tags 26 with the address tag and cache state from the TTC tags 24, and invalidating the tag in the TTC tags 24. If the read is a hit in the TTC 22, in the WA section (decision block 66, "yes" leg), the control unit 28 may generate a fill if the line is incomplete in the WA section (block 68). The fill may be generated if any bytes are missing in the line, or only if the read accesses a byte that is missing, in various embodiments. The fill data may be merged into the WA section (and the valid bit vector may be set to all ones). The TTC may forward the read data, increment the counter, and possibly move the line to the L1 data cache 20 similar to a hit in the RA section of the TTC 22 (blocks 58, 60, 62, and 64).

Figure 6:
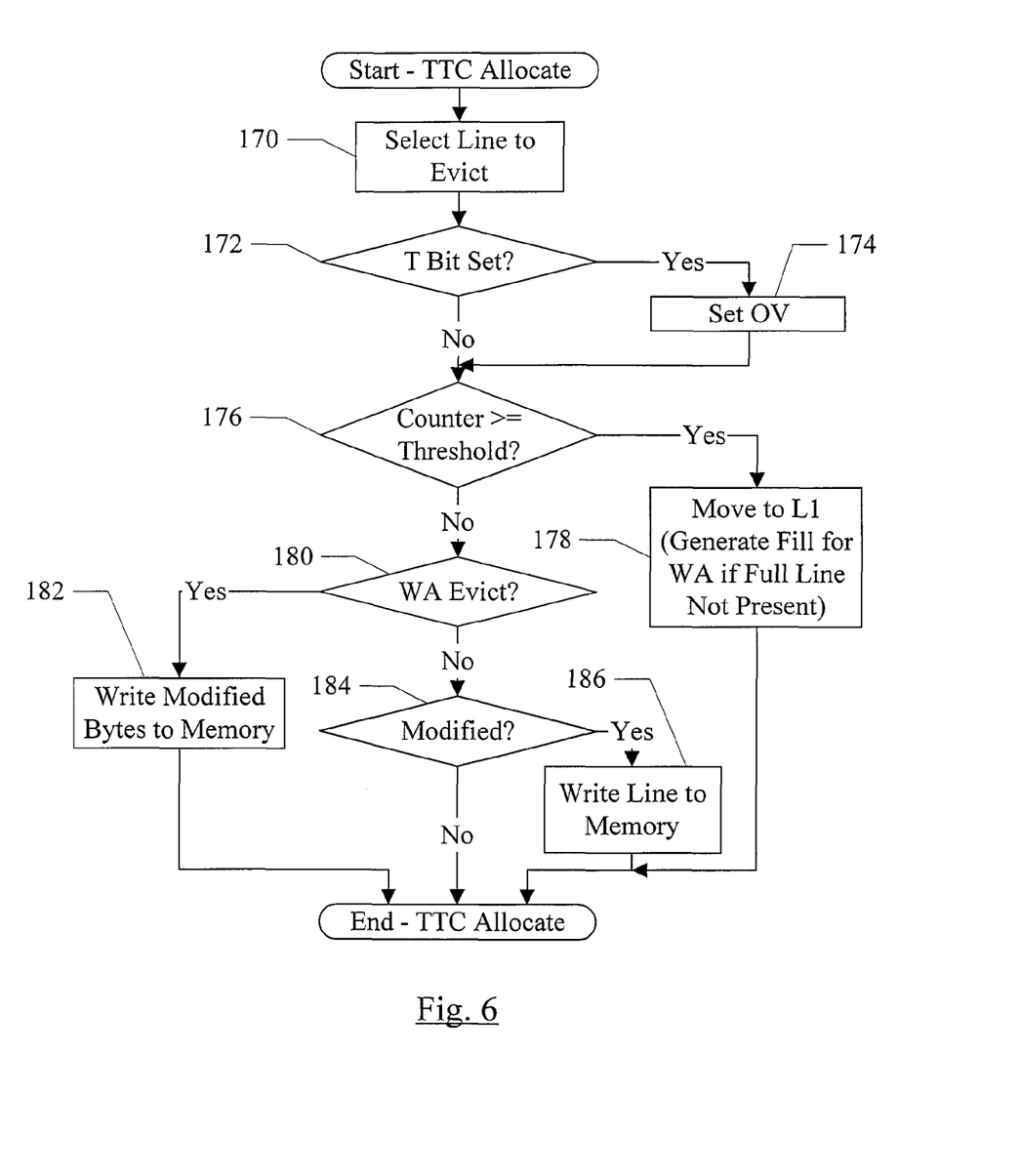
FIG. 6 is a flowchart illustrating operation of one embodiment of the transient/transactional cache for an allocate.

If the read memory operation is a miss in both the L1 data cache 20 and the TTC 22 (decision blocks 52, 56, and 66, "no" legs), the control unit 28 may generate a fill for the TTC 22 RA section (block 70). The control unit 28 may allocate an entry in the TTC 22 RA section, which may cause an eviction of a valid line in the RA section. The flow chart of FIG. 6 illustrates the allocation process for one embodiment, and is described in more detail below. The control unit 28 may set the valid bits, reset the counter, and clear the T bit in the TTC tags 24 for the allocated entry (block 72). The TTC 22 may forward the fill data as the read data (block 74).

If the read operation is a transactional read (decision block 50, "yes" leg) and the read is a hit in the L1 data cache 20 (decision block 76, "yes" leg), the control unit 28 may move the cache line to the TTC (block 78). Moving the line may include transmitting the line from the L1 data cache 20 to the TTC 22, allocating a storage location in the TTC 22 (see FIG. 6 and its description below), writing the TTC tags 24 with the address tag and cache state from the L1 tags 26, and invalidating the tag in the L1 tags 26. In some embodiments, if the cache line is modified in the L1 data cache 20, the modified line may also be transmitted to the external interface unit 18 to write out the data. Such operation may be performed in case the transaction fails, so pre-transaction updates are not lost. The control unit 28 may set the T bit in the TTC tags 24 for the entry (and may clear the U and P bits in the entry—block 80). The L1 data cache 20 may forward the read data to the execution core 14 as well (block 82). If the read is a hit in the TTC RA section (decision block 84, "yes" leg), the control unit 28 may set the T bit in the hitting entry (block 80) and the TTC 22 may forward the read data (block 82). If the read is a hit in the TTC WA section (decision block 86, "yes" leg), the control unit 28 may generate a fill if the cache line is incomplete (block 88) and may set the T bit for the entry and forward the data from the TTC 22 (blocks 80 and 82). If the read is a miss in both the L1 data cache 20 and the TTC 22 (decision blocks 76, 84, and 86, "no" legs), the control unit 28 may generate a fill for the TTC 22 (block 90). The control unit 28 may allocate an entry in the TTC 22 (as illustrated in FIG. 6 and described in more detail below). The control unit 28 may set the T bit in the entry (and clear the U and P bits), and may forward the read data (blocks 80 and 82).

Figure 4:
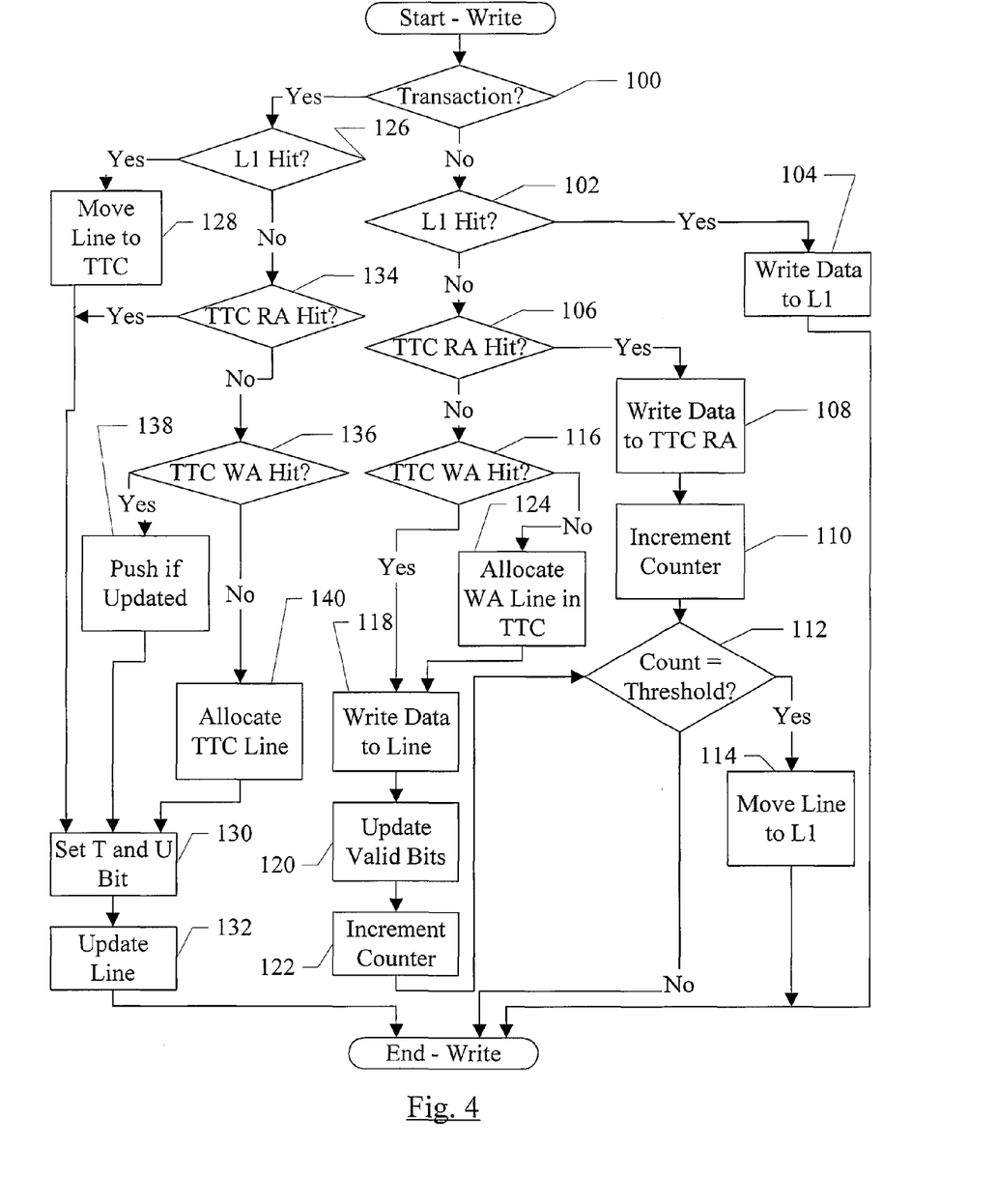
FIG. 4 is a flowchart illustrating operation of one embodiment of the processor for write operations.

Turning next to FIG. 4, a flowchart is shown illustrating operation of one embodiment of the processor 10 for a write operation. While the blocks are shown in a particular order for ease of understanding, other orders may be used. Blocks may be performed in parallel in combinatorial logic in the processor 10. Blocks, combinations of blocks, and/or the flowchart as a whole may be pipelined over multiple clock cycles in the processor 10. Particularly, checking for cache hits in the L1 data cache 20 and the TTC 22 may be performed in parallel.

If the write operation is not a transactional write (decision block 100, "no" leg), the operation is a memory write operation. If the memory write operation is a hit in the L1 data cache 20 (decision block 102, "yes" leg), the L1 data cache 20 may write the data to the hitting entry (block 104). The control unit 28 may assert a write enable for the hitting entry to the L1 data cache 20, in some embodiments. If the write operation is a hit in the TTC 22, in the RA section (decision block 106, "yes" leg), the control unit 28 may cause the TTC 22 to write the data to the hitting entry (block 108). Additionally, the control unit 28 may increment the counter in the counter field 44B for the hit entry (block 110). If the count exceeds a threshold for writes (decision block 112, "yes" leg), the control unit 28 may determine that the cache line is not transient data and may move the cache line to the L1 data cache 20 (block 114). Moving the line may include transmitting the line from the TTC 22 to the L1 data cache 20, allocating a storage location in the L1 data cache 20 (and evicting the cache line stored therein to the external interface unit 18, if applicable), writing the L1 tags 26 with the address tag and cache state from the TTC tags 24, and invalidating the tag in the TTC tags 24. If the write is a hit in the TTC 22, in the WA section (decision block 116, "yes" leg), the control unit 28 may cause the TTC 22 to write the data to the hit entry (block 118). The control unit 28 may update the valid bit vector 44A in the hitting entry to set the valid bits written by the write operation (block 120), and may increment the counter in the counter field 44B in the hit entry (block 122). The control unit 28 may determine if the count exceeds the threshold (decision block 112) and may move the cache line to the L1 data cache 20 if so (block 114). If the write memory operation is a miss in both the L1 data cache 20 and the TTC 22 (decision blocks 102, 106, and 166, "no" legs), the control unit 28 may allocate an entry in the TTC 22 WA section, which may cause an eviction of a valid line in the WA section (block 124 and see the flow chart of FIG. 6 and its description below). The control unit 28 may set the valid bits, reset the counter, and clear the T bit in the TTC tags 24 for the allocated entry (block 72). The control unit 28 may write the data to the allocated line (block 118), update the valid bits (block 120), and optionally increment the counter (block 122). In this case, the count is not greater than the threshold (decision block 112, "no" leg).

If the write operation is a transactional write (decision block 100, "yes" leg) and the write is a hit in the L1 data cache 20 (decision block 126, "yes" leg), the control unit 28 may move the cache line to the TTC (block 128). Moving the line may include transmitting the line from the L1 data cache 20 to the TTC 22, allocating a storage location in the TTC 22 (and evicting the cache line stored therein to the external interface unit 18, if applicable), writing the TTC tags 24 with the address tag and cache state from the L1 tags 26, and invalidating the tag in the L1 tags 26. In some embodiments, if the cache line is modified in the L1 data cache 20, the modified line may also be transmitted to the external interface unit 18 to write the data to the memory hierarchy. Such operation may be performed in case the transaction fails, so pre-transaction updates are not lost. The control unit 28 may set the T bit and the U bit in the TTC tags 24 for the entry (and may clear the P bit in the entry—block 130). The L1 data cache 20 may update the line with the write data (block 132). If the write is a hit in the TTC RA section (decision block 134, "yes" leg), the control unit 28 may set the T bit and the U bit in the hitting entry (block 130) and the TTC 22 may update the line with the write data (block 132). If the write is a hit in the TTC WA section (decision block 136, "yes" leg), the control unit 28 may push the updates in the cache line to the external interface unit 18 if the T bit is clear in the hitting entry (block 138), to preserve the pre-transaction updates in case the transaction fails. The control unit 28 may set the T bit and the U bit for the entry and write the data to the TTC 22 (blocks 130 and 132). If the write is a miss in both the L1 data cache 20 and the TTC 22 (decision blocks 126, 134, and 136, "no" legs), the control unit 28 may allocate an entry in the TTC cache 22 (block 140, and see FIG. 6 and its description below). The control unit 28 may set the T bit and the U bit in the entry (and clear the P bit), and may write the data to the cache line (blocks 130 and 132).

It is noted that, in addition to the operation shown in FIG. 4, the processor 10 may perform coherence activities to obtain a correct cache state for the cache line in order to update the cache line. It is also noted that, in the embodiment illustrated via FIGS. 3 and 4, the L1 data cache 20 and the TTC 22 are exclusive of each other. That is, a given cache line is stored in at most one of the L1 data cache 22 and the TTC 22.

Figure 5:
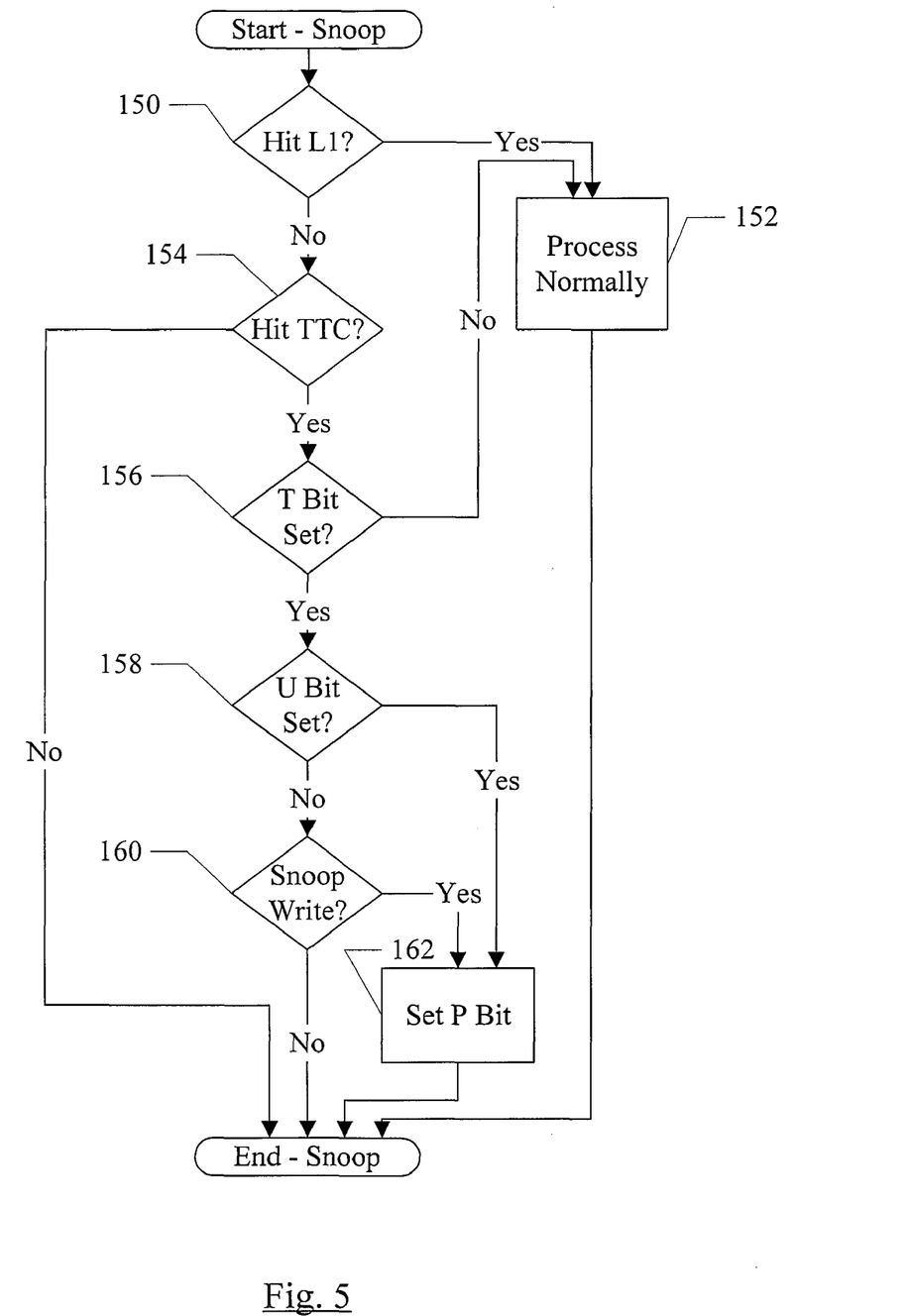
FIG. 5 is a flowchart illustrating operation of one embodiment of the processor for snoop operations.

Turning next to FIG. 5, a flowchart is shown illustrating operation of one embodiment of the processor 10 for a snoop operation received by the external interface unit 18. In general, a snoop operation may be generated to the processor 10 in response to a read or write operation from another processor or device in a system that includes the processor 10. The snoop operation may be used to maintain cache coherency in the system. The snoop operation may be directly snooped from operations on an interconnect to which the external interface unit 18 is coupled, or may be probe operations generated by a point of coherency in the system, for example. While the blocks are shown in a particular order for ease of understanding, other orders may be used. Blocks may be performed in parallel in combinatorial logic in the processor 10. Blocks, combinations of blocks, and/or the flowchart as a whole may be pipelined over multiple clock cycles in the processor 10. Particularly, checking for snoop hits in the L1 data cache 20 and the TTC 22 may be performed in parallel.

If the snoop is a hit in the L1 data cache 20 (decision block 150, "yes" leg), the snoop may be processed normally (block 152). If the snoop is a hit in the TTC 22 (decision block 154, "yes" leg) and the T bit is clear in the hit entry (decision block 156, "no" leg), the snoop may also be processed normally (block 152). If the snoop is a hit in the TTC 22 (decision block 154, "yes" leg) and the T bit is set in the hit entry (decision block 156, "yes" leg), the snoop hit is affecting transaction data. If the U bit is clear (decision block 158, "no" leg), the snoop hit may only be an interference with the transaction if the snoop indicates a write operation (decision block 160). If the snoop hit indicates a write operation (decision block 160, "yes" leg), the control unit 28 may set the P bit in the hitting entry, indicating the detection of the interfering probe (block 162). If the U bit is set (decision block 158, "yes" leg), the snoop hit is an interference no matter what type of snoop it is and the P bit is set in the hitting entry (block 162).

Turning next to FIG. 6, a flowchart is shown illustrating operation of one embodiment of the data cache 16 to allocate an entry in the TTC 22. While the blocks are shown in a particular order for ease of understanding, other orders may be used. Blocks may be performed in parallel in combinatorial logic in the processor 10. Blocks, combinations of blocks, and/or the flowchart as a whole may be pipelined over multiple clock cycles in the processor 10.

The control unit 28 may select a line to evict from the TTC 22 (block 170). Various algorithms may be used for selection. For example, a least recently used algorithm may be used, or other similar eviction selection algorithms that have been implemented for caches may be used. Alternatively, the control unit 28 may attempt to select an invalid entry in the TTC 22, then a clean, non-transactional line if no invalid entry is available, then a modified non-transactional line if no clean lines are available, then a transactional line if no non-transactional line is available. If the T bit is set in the selected line (decision block 172, "yes" leg), then a transactional line is being evicted and will not longer be tracked. The control unit 28 may set the OV bit 32 to cause the transaction to fail when a verify/commit instruction is executed (block 174). If the counter in the counter field 44B of the evicted line is greater than or equal to a threshold level (decision block 176, "yes" leg), the line may be determined to be non-transient and may be moved to the L1 data cache 20 (block 178). If the line is in the WA section and is incomplete, the control unit 28 may generate a fill for the line and the written bytes may be merged with the fill data. If the counter is not greater than the threshold (decision block 176, "no" leg) and the line is in the WA section of the TTC 22 (decision block 180, "yes" leg), the control unit 28 may cause the written bytes to be transferred to the external interface unit 18 to be written to memory (block 182). Otherwise, if the RA section line is modified (decision block 184, "yes" leg), the updated line may be written to memory (block 186).

Figure 7:
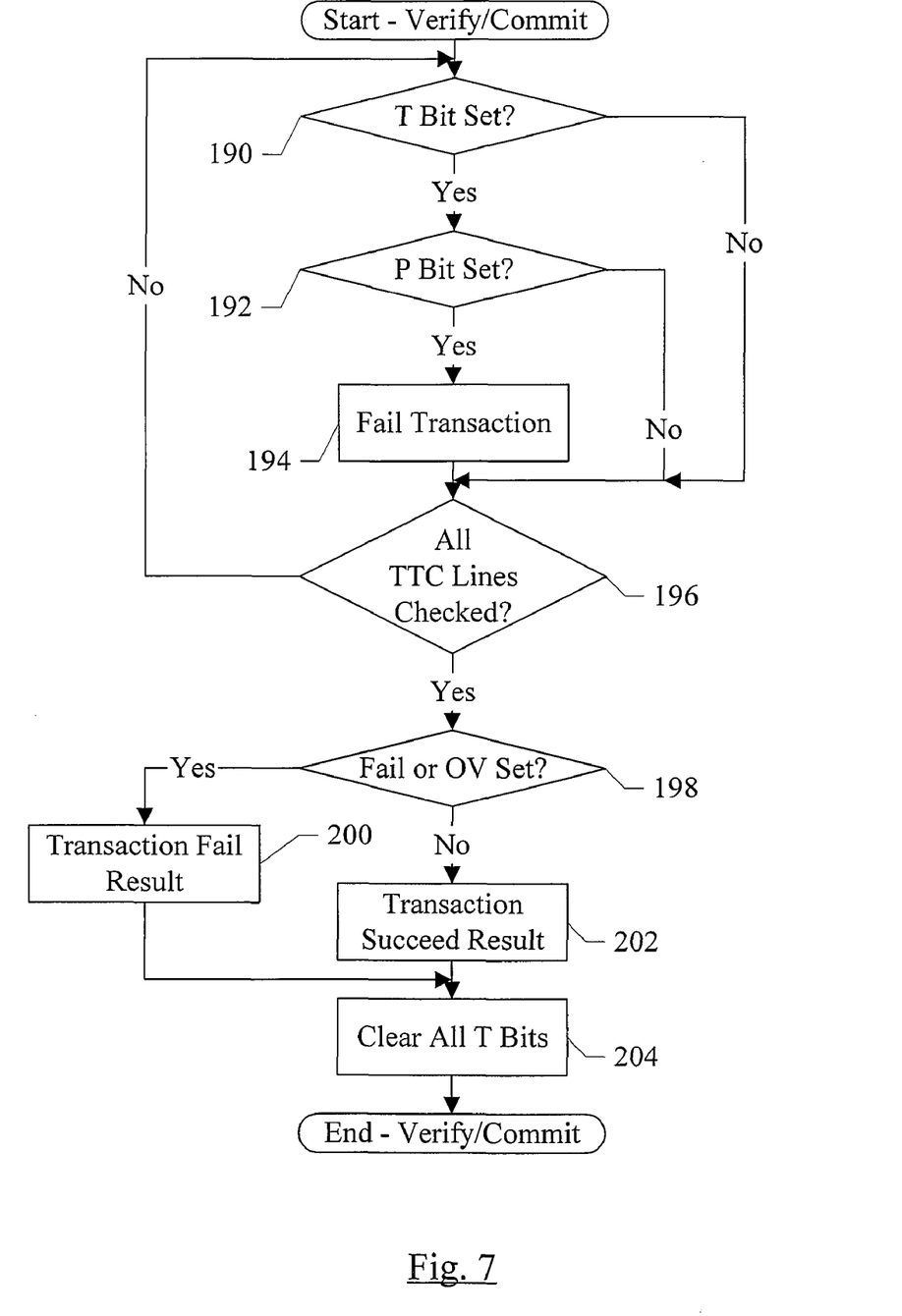
FIG. 7 is a flowchart illustrating operation of one embodiment of the processor for a commit operation.

Turning next to FIG. 7, a flowchart is shown illustrating operation of one embodiment of the processor 10 to execute a verify or commit instruction. While the blocks are shown in a particular order for ease of understanding, other orders may be used. Blocks may be performed in parallel in combinatorial logic in the processor 10. Blocks, combinations of blocks, and/or the flowchart as a whole may be pipelined over multiple clock cycles in the processor 10.

For each TTC line, if the T bit is not set (decision block 190, "no" leg) or the T bit is set (decision block 190, "yes" leg) and the P bit is not set (decision block 192, "no" leg), then the transaction does not fail due to that line. If the T bit is set and the P bit is set (decision blocks 190 and 192, "yes" leg), then the transaction fails (block 194). If all the TTC lines have not been checked (decision block 196, "yes" leg), the blocks 190, 192, and 194 may be repeated for the other lines. It is noted that, in some fully associative embodiments, the check may be performed in parallel for each line. If at least one failure is detected in the TTC 20, or the OV bit is set in the control unit 28 (decision block 198, "yes" leg), the control unit 28 may report a transaction fail result for the verify or commit (block 200). Otherwise (decision block 198, "no" leg), the a transaction success result may be reported for the verify or commit (block 202). The updates made by the transaction may be made visible to other processors/devices if the commit is being performed. The T bits may also be cleared if the commit is being performed, since the transaction is completed in either the fail or success case (block 204).

Numerous variations and modifications will become apparent to those skilled in the art once the above disclosure is fully appreciated. It is intended that the following claims be interpreted to embrace all such variations and modifications.

What is claimed is:

1. A processor comprising:
an execution core configured to execute instructions, wherein the execution core is configured to generate memory read and write operations responsive to instruction execution, and wherein the execution core is configured to generate transactional read and write operations responsive to executing transactional instructions;
a level 1 (L1) data cache coupled to the execution core and configured to store data;
a transient/transactional cache coupled to the execution core, wherein the transient/transactional cache is configured to cache memory data accessed responsive to memory read and write operations to identify potentially transient data and to prevent the identified transient data from being stored in the L1 data cache, and wherein the transient/transactional cache is configured to cache transaction data accessed responsive to transactional read and write operations to track transactions, and wherein each entry in the transient/transactional cache is usable for transaction data and for transient data at different points in time; and
a tag memory corresponding to the transient/transactional cache, wherein the tag memory comprises a tag for each entry in the transient/transactional cache, and wherein the tag memory further comprises a cache state corresponding to each entry, and wherein the cache state indicates whether or not the data in the entry has been modified with respect to memory, and wherein the tag includes transaction tracking data and transient tracking data, and wherein the transaction tracking data comprises a transaction indication that identifies the entry as storing transaction data, and wherein the transaction tracking data comprises an updated indication that indicates whether or not the transaction data has been updated by one or more transactional write operations, wherein the updated indication is separate from the cache state.

2. The processor as recited in claim 1 wherein the transaction tracking data comprises a probed indication that indicates whether or not a transaction has been compromised, the transaction including the transaction data in the entry.

3. The processor as recited in claim 1 wherein the transient tracking data comprises a counter that tracks a number of accesses to the transient data in the corresponding entry.

4. The processor as recited in claim 3 wherein, if the counter exceeds a threshold value, the corresponding transient data is identified as non-transient.

5. The processor as recited in claim 4 wherein the data is transferred to the L1 data cache responsive to the data being identified as non-transient.

6. The processor as recited in claim 1 wherein the transaction indication identifies the entry as storing either transaction data or potential transient data, dependent on a state of the transaction indication.

7. A processor comprising:
an execution core configured to execute instructions, wherein the execution core is configured to generate memory read and write operations responsive to instruction execution, and wherein the execution core is configured to generate transactional read and write operations responsive to executing transactional instructions;
a level 1 (L1) data cache coupled to the execution core and configured to store data;
a transient/transactional cache coupled to the execution core, wherein the transient/transactional cache is configured to cache memory data accessed responsive to memory read and write operations to identify potentially transient data and to prevent the identified transient data from being stored in the L1 data cache, and wherein the transient/transactional cache is configured to cache transaction data accessed responsive to transactional read and write operations to track transactions, and wherein each entry in the transient/transactional cache is usable for transaction data and for transient data at different points in time; and
a tag memory corresponding to the transient/transactional cache, wherein the tag memory comprises a tag for each entry in the transient/transactional cache, and wherein the tag includes transaction tracking data and transient tracking data, and wherein the transaction tracking data comprises a transaction indication that identifies the entry as storing transaction data, and wherein the transaction tracking data comprises a probed indication that indicates whether or not a transaction has been compromised, the transaction including the transaction data in the entry; and
wherein the execution core is configured to execute a transactional instruction that determines if the transaction is compromised, and wherein the execution core is configured to check the entries for which the transaction indication indicates a transaction for probed indications indicating that the transaction has been compromised to generate a result of the transactional instruction.

8. The processor as recited in claim 7 wherein the tag memory further comprises a cache state corresponding to each entry, and wherein the cache state indicates whether or not the data in the entry has been modified with respect to memory, and wherein the transaction tracking data comprises an updated indication that indicates whether or not the transaction data has been updated by one or more transactional write operations, and wherein the updated indication is separate from the cache state.

9. The processor as recited in claim 7 wherein the transient tracking data comprises a counter that tracks a number of accesses to the transient data in the corresponding entry.

10. The processor as recited in claim 9 wherein, if the counter exceeds a threshold value, the corresponding transient data is identified as non-transient.

11. The processor as recited in claim 10 wherein the data is transferred to the L1 data cache responsive to the data being identified as non-transient.

12. The processor as recited in claim 7 wherein the transaction indication identifies the entry as storing either transaction data or potential transient data, dependent on a state of the transaction indication.

13. A method comprising:
generating memory read and write operations responsive to instruction execution in a processor;
generating transactional read and write operations responsive to executing transactional instructions;
caching memory data accessed responsive to memory read and write operations in a transient/transactional cache;
monitoring the memory data cached in the transient/transaction cache to identify potentially transient data and to prevent the identified transient data from being stored in a level 1 (L1) data cache in the processor;

caching transaction data accessed responsive to transactional read and write operations in the transient/transactional cache to track transactions, wherein each entry in the transient/transactional cache is usable for transaction data and for transient data at different points in time;

wherein a tag memory corresponds to the transient/transactional cache, and wherein the tag memory comprises a tag for each entry in the transient/transactional cache, and wherein the tag includes transaction tracking data and transient tracking data, and wherein the transaction tracking data comprises a transaction indication that identifies the entry as storing transaction data, and wherein the transaction tracking data comprises a probed indication that indicates whether or not a transaction has been compromised, the transaction including the transaction data in the entry, the method further comprising:

setting the transaction indication to a state indicating the data is transaction data responsive to caching transaction data in the entry;

setting the transaction indication to a state indicating that the data is transient data responsive to caching potential transient data in the entry; and executing a transactional instruction that determines if the transaction is compromised, and wherein the executing comprises checking the entries for which the transaction indication indicates a transaction for probed indications indicating that the transaction has been compromised to generate a result of the transactional instruction.

14. The method as recited in claim 13 wherein the tag memory further comprises a cache state corresponding to each entry, and wherein the cache state indicates whether or not the data in the entry has been modified with respect to memory, and wherein the transaction tracking data comprises an updated indication that indicates whether or not the transaction data has been updated by one or more transactional write operations, and wherein the updated indication is separate from the cache state.

15. The method as recited in claim 13 wherein the transient tracking data comprises a counter that tracks a number of accesses to the transient data in the corresponding entry; wherein performing a memory read or write operation comprises detecting hit in the corresponding entry and incrementing the counter.

16. The method as recited in claim 15 wherein, responsive to the counter exceeding a threshold value, identifying the corresponding data as non-transient.

17. The method as recited in claim 16 further comprising transferring the data to the L1 data cache responsive to the data being identified as non-transient.

* * * * *